(12) United States Patent
Wiener et al.

(10) Patent No.: US 7,996,250 B2
(45) Date of Patent: Aug. 9, 2011

(54) WORKFLOW CONTROL USING AN AGGREGATE UTILITY FUNCTION

(75) Inventors: Janet Lynn Wiener, Palo Alto, CA (US); John Wilkes, Palo Alto, CA (US); Alvin AuYoung, San Jose, CA (US); Laura Ellen Grit, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1318 days.

(21) Appl. No.: 11/554,541

(22) Filed: Oct. 30, 2006

(65) Prior Publication Data

US 2008/0103866 A1     May 1, 2008

(51) Int. Cl.
   *G06Q 10/00* (2006.01)
(52) U.S. Cl. ............... 705/7.12; 705/7.11; 705/7.23
(58) Field of Classification Search ............ 705/7.11, 705/7.12, 7.23
   See application file for complete search history.

(56) References Cited

U.S. PATENT DOCUMENTS

| | | | | |
|---|---|---|---|---|
| 6,154,778 | A * | 11/2000 | Koistinen et al. | 709/228 |
| 6,321,133 | B1 * | 11/2001 | Smirnov et al. | 700/100 |
| 2003/0067935 | A1 * | 4/2003 | Hosein | 370/437 |
| 2004/0114514 | A1 * | 6/2004 | Ghosal et al. | 370/230 |
| 2004/0136379 | A1 * | 7/2004 | Liao et al. | 370/395.21 |
| 2005/0172291 | A1 * | 8/2005 | Das et al. | 718/104 |
| 2007/0299980 | A1 * | 12/2007 | Amini et al. | 709/231 |

OTHER PUBLICATIONS

Buyya, Rajkumar and Yeo, Chee Shin. "Service Level Agreement Based Allocation of Cluster Resources: Handling Penalty to Enhance Utility." Grid Computing and Distributed Systems Laboratory Department of Computer Science and Software Engineering, The University of Melbourne, Australia, Jul. 30, 2005.*
Integrated Network Management VIII Managing It All. Edited by Goldszmidt, German and Schonwalder, Jurgen. Kluwer Academic Publishers: Massachusetts, 2003 (Hereinafter "Goldszmidt").*
AuYoung, Alvin., Grit, Laura, Wiener, Janet and Wilkes, John."Service Contracts and Aggregate Utility Functions." HPDC '06 Proceedings of the 15$^{th}$ IEEE International Symposium on High Perfromance Distributed Computing, pp. 119-131 Jun. 2006.*
Das, Rajarshi, Kephart, Jeffrey O., Tesauro, Gerald, Walsh, William E. "Utility Functions in Autonomic Systems." Proceedings of First Internation Conference on Autonomic Computing, 2004.*
Liu, Li, Wang, Yuanzhuo, Yang, Yang and Liu, Songtao."Utility-Based On-Demand Heuristic Strategy to Grid Computing." Proceedings of the jOint International Conference on Automnomic and Autonomous Systems and Internation Conference on Networking and Services (ICAS/ICNS), 2005.*
Guocong Song; Ye Li; , "Utility-based resource allocation and scheduling in OFDM-based wireless broadband networks," Communications Magazine, IEEE , vol. 43, No. 12, pp. 127-134, Dec. 2005 doi: 10.1109/MCOM.2005.1561930 URL: http://ieeexplore.ieee.org/stamp/stamp.jsp?tp=&arnumber=1561930&isnumber=33162.*

(Continued)

*Primary Examiner* — Beth V Boswell
*Assistant Examiner* — Renae Feacher

(57) ABSTRACT

Provided are, inter alia, systems, methods and techniques for controlling workflow by identifying an individual job that is part of an overall deliverables package that covers multiple jobs. An aggregate utility function is obtained, specifying utility based on an aggregate metric across the overall deliverables package, and a current operating point is determined on the aggregate utility function. An effective utility is calculated for the individual job based on the aggregate utility function and the current operating point, and the execution of work is controlled based on the effective utility for the individual job.

22 Claims, 4 Drawing Sheets

OTHER PUBLICATIONS

Chunlin, Li and Layuan, Li."A distributed Utility-Based Two Level Market Solution for Optimal Resource Scheduling in Computational Grid." Parallel Computing, vol. 31, Issues 3-4, Mar.-Apr. 2005, pp. 332-351.*

Huber, George."Multi-Attribute Utility Models: A Review of Field and Field-Like Studies." Management Science, vol. 20, No. 10, Application Series Jun. 1974.*

Rajkumar, Rgunathan, Lee, Chen, Lehoczky, John P and Siewiorek, Daniel P. "Practical Solutions for QoS-Based Resource Allocation Problems."Real-Time Systems Symposium, 1998. Proceedings., The 19th IEEE.*

Johari, Ramesh and Tsitsiklis, John N."Efficiency Loss in a Network Resurce Allocation Game." Mathematics of Operations Research, vol. 29, No. 3, Aug. 2004, pp. 407-435.*

Mohamed, Amr Mahmoud (2006). Utility-based resource and QoS optimization in packet networks. Ph.D. dissertation, The University of British Columbia (Canada), Canada. Retrieved May 31, 2011, from Dissertations & Theses: Full Text.(Publication No. AAT NR20051).*

EIC STIC Search PDF, May 31, 2011.*

Dialog Search, May 31, 2011.*

Proquest Search, May 31, 2011.*

"Supplementary Appendix: Health Insurance and Consumer Choice", downloaded from eguilibrium.heinz.cmu.edu/mgaynor/papers/NFP-FP_Supplementary.pdf on Dec. 29, 2006.

"Economics 300, Winter 2002", downloaded from http://www.econ.washington.edu/user/erose/Labor%20Supply%20Example.pdf on Dec. 28, 2006.

Ronald Leroi Burback, "Uncertain Utilities," printout from http://infolab.stanford.edu/~burback/watersluice/node171.html, dated Dec. 14, 1998.

Steven M. Goldman, Paul A. Ruud, "On the Nonconvexity of the Set of Utility-based Demand Functions" printout from http://socs.berkeley.edu/~sgoldman/demand.ps, dated Aug. 17, 1995.

Abstract of Steven M. Goldman, Paul A. Ruud, "On the Nonconvexity of the Set of Utility-based Demand Functions", , dated Aug. 17, 1995, printed out from http://socs.berkeley.edu/~sgoldman/demand.ps.

Binoy Ravindran, Peng Li, Haisang Wu, E. Douglas Jensen, "Adaptive TimeCritical Resource Management Using Time/Utility Functions"; downloaded from http://www.mitre.org/work/tech_papers/tech_papers_04/jensen_adaptive/index.html, dated.

"Utility," printed out from http://en.wikipedia.org/wiki/Utility_function on Dec. 22, 2006.

* cited by examiner

WORKFLOW CONTROL USING AN AGGREGATE UTILITY FUNCTION

FIELD OF THE INVENTION

The present invention pertains to systems, methods and techniques for controlling workflow, and is applicable, e.g., to job scheduling, job admittance and contract-work admittance.

BACKGROUND

A great deal of effort has been devoted to automated techniques for making workflow decisions, such as what jobs to accept and how to schedule those jobs that have been accepted. However, improvements in the conventional techniques still are desirable.

DESCRIPTION OF THE PREFERRED EMBODIMENT(S)

Figure 1:
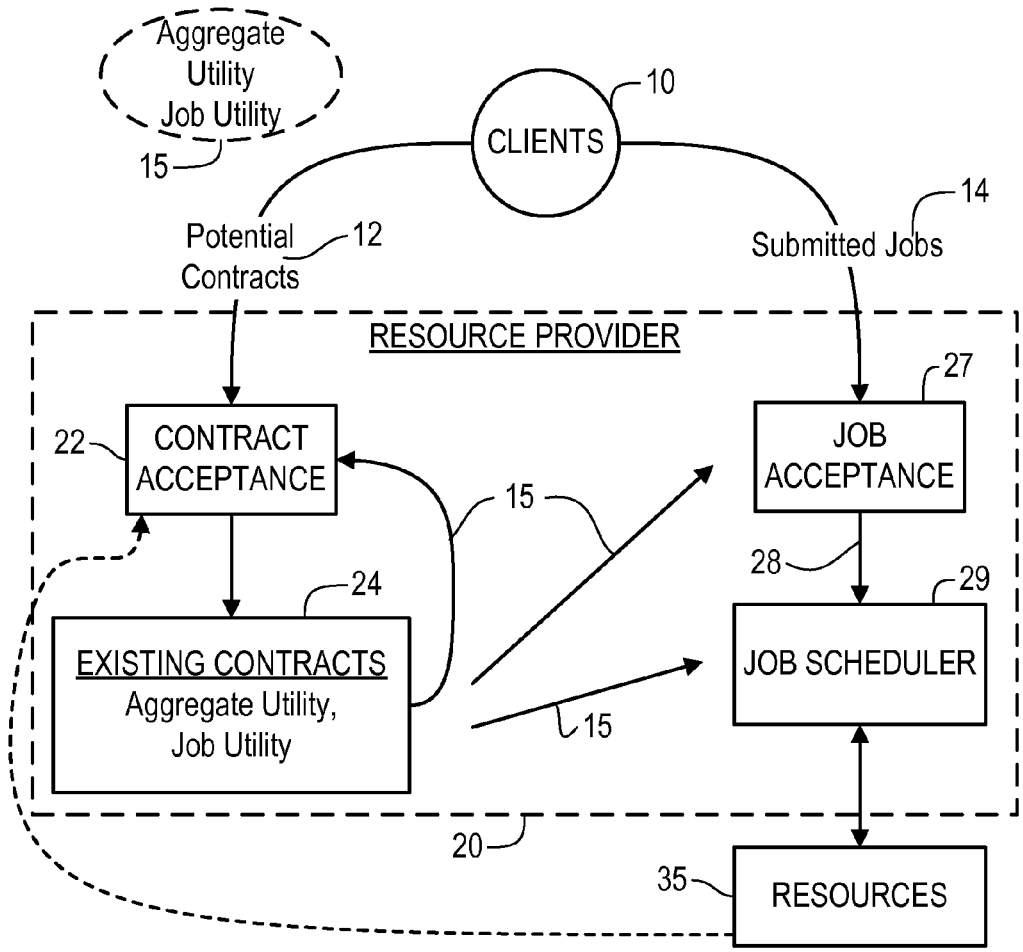
FIG. 1 is a block diagram illustrating a context in which certain workflow methods and techniques can be applied, according to representative embodiments of the present invention.

The present invention applies to any situation involving provision of services and/or products where multiple items of work (e.g., jobs) are to be performed or provided, but where the simple sum of the worth of the individual jobs does not adequately convey the value of completing a specific fraction (e.g., all, or 90%) of such jobs, or completing such jobs according to an overall criterion. Accordingly, the techniques of the present invention can be applied, e.g., to clusters of computers, next-generation data centers, utility services, service-oriented computing, service businesses and producers of customized or semi-customized products.

As used herein, the term "job" is to be understood in its broadest sense, as including any product or service to be delivered to a client, customer, consumer or other user (all of the foregoing generally be referred to as a "client" herein). Thus, a job can include, e.g., performance of certain specific services, delivery of certain products, making available certain services or resources for a specified period of time, or any combination of any of the foregoing. The term "service/resource provider" is intended to encompass any person or entity that provides or performs jobs for another.

The present invention is particularly (although not exclusively) applicable to jobs involving some dedication of scarce resources to a particular client (as opposed to merely selling a commodity for which there is ample supply). Accordingly, the techniques of the present invention often will be able to provide significant value in connection with the provision of services, the delivery of products where there is some product customization involved, or making available any limited resource (such as computing time), e.g., for specified periods of time.

One advantage resulting from representative embodiments of the present invention is that clients (e.g., who have work that needs to be completed) are allowed to constrain the behavior of service/resource providers (who perform the work) in a way that encourages the service/resource providers to get closer to the client's true value for the collected set of work. Alternatively, where all of the details of the relationship are not set forth in a formalized contract, similar results can be achieved by the service/resource provider estimating the client's needs and the impact on the client of failure to meet those needs. The following three problems are examples of situations that can be addressed using the present invention:

An individual runs 100,000 jobs over a weekend on a shared computing cluster in order to perform an experiment. Each job takes a few minutes to run and produces one data point on a graph. The graph is nearly useless if too few data points have been obtained by Monday morning, but completing 90% is almost as good as completing all of them. No particular job is more important than any other; it is the aggregate set of results that counts.

Computer-graphics film animators often compete with each other for access to a computing farm on which they run multi-hour rendering jobs overnight. For any particular animator, getting an individual image back the following morning has some benefit, and getting more rendering complete is better, but sometimes the majority of the sequence needs to complete for any of it to be useful. No particular image frame is more important then any other; it is the overall effect that matters.

Outsourced business services often have formal service level agreements (SLAs) or contracts that include penalties for poor performance. If the response time is too high for too many transactions, the service provider will earn less, and might even have to pay out more than it takes in. No individual transaction is more important than any other; the percentage of transactions that violate the bound matters.

In all of these examples, per-job or per-work-item information does not capture the true intent of the client, leaving the service/resource provider to do the best it can, but risking unhappy clients, under-utilized services, or both. The present invention provides additional control that can take into account the client's desires (whether specified by the client or the service/resource provider) while not unduly constraining the service/resource provider.

FIG. 1 illustrates one representative context in which the present invention can be applied. As shown, the present example contemplates two categories of participants: a plurality of clients (or potential clients) 10 and a service/resource provider 20. Ordinarily, service/resource provider 20 will be an outside contractor, but instead could be within the same organization as some or all of the clients 10.

In either event, in the present example service/resource provider 20 has the opportunity, over time, to accept or reject contracts 12 pertaining to the different clients 10. Each such contract 12 could be originated by one of the clients 10 and proposed to service/resource provider 20, or instead could be originated internally by service/resource provider 20 (e.g., representing a potential deal that service/resource provider 20 is considering undertaking).

More specifically, in the present example each client 10 negotiates a contract 12 with the service/resource provider 20 with respect to an overall deliverables package that contemplates performance of multiple jobs over some period of time (which could be either a relatively short period of time, such as overnight, or an extended period of time, such as months or years). Once a potential contract 12 is accepted by the parties (e.g., after satisfying the acceptance criteria of module 22), it becomes one of the existing contracts 24 of service/resource provider 20. Thereafter, the contracting client 10 has the ability to submit jobs 14 under such contract 24.

When a job 14 is properly submitted under an existing contract 24, the service/resource provider 20 is required to complete it in accordance with the terms of the contract 12 or incur negative economic consequences (e.g., reduction in compensation, payment of penalties or other negative-performance-based charges, or the like). On the other hand, a high level of performance might earn service/resource provider 20 a bonus or other additional compensation or benefits under the contract 24.

The client 10 generally also will bind itself under the resulting contract 24, e.g., by including a description of the contract's workload in sufficient detail to allow its aggregate load and value to be estimated, but typically not the precise timings of when jobs 14 will arrive or their individual sizes or values. For example, the description provided by the client 10 might include estimates of the number of jobs 14, their sizes, arrival rates, and utility functions (discussed below), in the form of distributions (e.g., the distributions used by client workload-generators).

To facilitate the following discussion, the present example is referenced throughout this disclosure and, for purposes of this example, it is assumed that each contract 12 and 24 is a service-level agreement. Generally speaking, service-level agreements specify a service to be provided, its quality or quantity levels (e.g., the load that the client 10 can impose), price, and penalties for non-compliance. An optional per-job utility function essentially specifies a mini-SLA for a particular job, typically providing rewards for early completion, and penalties for running late. In addition, in the present example it is assumed that the individual contracts 12 and 24 contain provisions pertaining both to individual jobs and to some broader overall deliverables package that covers multiple jobs, e.g., over some extended period of time.

However, it should be understood that the present invention generally applies to a wide variety of different kinds of arrangements in which jobs are part of (or can be considered to be part of) an overall deliverables packages. Such an overall deliverables package might be defined, e.g. in a formal written contract 12 or 24 (as in the present example). Alternatively, the overall deliverables package might instead be an informal construct with no clearly defined penalties or bonuses based on performance, but rather implied penalties or bonuses (usually intangible) that likely will apply based on overall performance of the jobs in the constructed deliverables package. Probably the most common example is expected loss of or increase in a client's goodwill (and therefore future business), or other changes in customer satisfaction, customer complaints or customer revenue, based on the service/resource provider's performance over some measure of time (e.g., one month or one year). In such cases, the service/resource provider 20 internally defines an aggregate utility function (discussed below) for a particular overall deliverables package based on assumptions and/or expectations regarding impact on the client resulting from different aggregate metrics. Accordingly, while the term "contract" frequently is used herein with respect to the present example, it should be understood that such references apply equally to any other overall deliverables package.

Also, it should be noted that the overall deliverables package can include any of a variety of different types of jobs and even mixed types of jobs within the same package. For example, a single contract 12 or 24 might encompass delivery of different types of services together with delivery of different types of hardware, e.g., at different points in time according to a defined schedule.

As indicated above, one of the decisions that must be made by service/resource provider 20 is whether to accept or reject a potential new contract. For that purpose, service/resource provider 20 uses contract acceptance module 22 to evaluate the merits of each potential contract 12. In the preferred embodiments of the invention, the decision is made on an automated basis (e.g., by executing software instructions from a computer-readable medium). More preferably, if a particular potential contract 12 can be performed and if it increases the overall profits of service/resource provider 20, then it is accepted. Otherwise, it is rejected.

As discussed in more detail below, such a decision preferably takes into account not only the agreed-upon payments for and costs associated with a potential contract 12, but also the effect that accepting the contract 12 likely would have on performance of the other existing contracts 24, as well as the corresponding expected costs resulting from any performance impairment with respect to such existing contracts 24 (e.g., additional penalties that might have to be paid under such contracts 24). In addition, the decision made by module 22 preferably also considers the other potential contracts 12 that currently are available and/or that are expected in the future (e.g., the near future), together with how a decision to accept the present potential contract 12 will affect the ability of service/resource provider 20 to accept such other contracts 12 and the relative profitabilities of such potential contracts 12.

In the preferred embodiments of the invention, two factors underlie all of these considerations: (i) the aggregate utility function with respect to one or more of the potential contracts 12 and the existing contracts 24; and (ii) the job utility with respect to the individual jobs 14 under such contracts 12 and 24. Thus, such parameters 15 are explicitly stated or implicitly present in some or all of the potential contracts 12 and, when such contracts 12 are accepted and therefore become existing contracts 24, are stored into the existing-contracts database 24 for access by the other components of the system 20. In this regard, it is noted that all of the features described herein pertaining to service/resource provider 20 can be performed by an automated system, e.g., comprising the individual modules 22, 24, 27 and 29 illustrated in FIG. 1. Such components can be implemented entirely in software stored on a machine-readable medium, or in any of the other ways described herein.

As discussed in more detail below, job acceptance module 27 determines which jobs 14 to perform based on an evaluation of the aggregate utility functions and job utilities 15 for the existing contracts 24, for the current job 14 under consideration and, to the extent accessible, for other jobs 14 that are being submitted for performance (or, more accurately, for evaluation to determine whether they will be performed). The jobs 14 that are accepted by module 27 (i.e., the accepted jobs 28) are then provided to job-scheduling module 29, which determines the sequence in which to perform such jobs 28.

The scheduling performed by module 29 preferably is based on information regarding resource availability from module 35, as well as an evaluation of the aggregate utility functions and job utilities 15 for the accepted, but as yet unscheduled, jobs 28 and their corresponding existing contracts 24. Essentially, scheduling module 29 (which also is discussed in more detail below) attempts to create an appropriate schedule based on such utility information and based on the availability of resources 35.

In this regard, performance of the jobs 28 generally will require the use of certain resources 35. Although resources 35 are illustrated in FIG. 1 as being external to service/resource provider 20, this is for conceptual purposes only. In fact, irrespective of whether resources 35 are internal or external to service/resource provider 20, for planning, pricing and other decisions, they preferably are treated as external resources (e.g., as independent profit centers) for which rent must be paid. As a result, it typically will be possible to more closely reflect the economic costs of using such resources 35.

Aggregate Utility

Generally speaking, the aggregate utility function specifies an overall utility effect (e.g., on the total net payment) for a set of jobs (or overall deliverables package), where such overall utility effect is a function of some quality or performance metric over the aggregation. Typical aggregate metrics include fraction completed, reliability, availability, correctness, conformance to or satisfaction of certain requirements or specifications (e.g., contractually specified), accuracy, specifically defined quality measures, timeliness, security, or any other indicator of quality of delivery. The present example assumes a fraction-completed metric, but this should not be taken as limiting. The same concepts apply to any quality metric, e.g., one that can be expressed as the value of X % of the work meeting the goal, for X between 0 and 100 (fractions and percentages being equivalent expressions and therefore used interchangeably herein).

Figure 2:
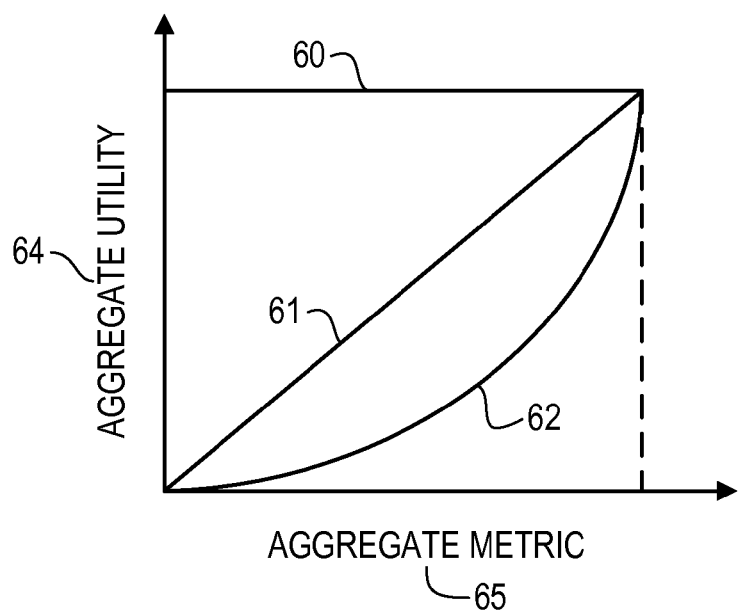
FIG. 2 is a graph illustrating examples of different aggregate utility functions within a common family, according to a representative embodiment of the present invention.

A representative family of aggregate utility functions is based on the formula aggregate_utility=$\alpha x^\beta$ for an aggregate metric value x in the range 0-1. Examples of such aggregate utility functions 60-62, expressing aggregate utility 64 as a function of an aggregate metric 65 are illustrated in FIG. 2. The parameter $\beta$ is a measure of the client's sensitivity to the aggregate metric x: when $\beta=0$ (e.g., function 60), the client 10 is completely indifferent to the metric's value; when $\beta=1$ (e.g., function 61), the client 10 is moderately sensitive (the relationship is linear); and for higher values of $\beta$ (e.g., function 62), the client 10 is increasingly sensitive. Where the aggregate metric is a fraction of jobs completed, then as $\beta$ increases, the client 10 is expressing increasing concern about completing all the jobs; for $\beta<1$, as it gets closer to 0, the client is expressing increasing indifference to having the last few jobs run.

Also, when $\beta=1$ (e.g., function 61) the client is uniformly sensitive to the metric's value, i.e., each incremental improvement in the value of the metric 65 (each completed job in the present example) is as important as any other incremental improvement of the same magnitude. However, as $\beta$ increases, more of the aggregate utility 64 is only achieved at higher values of the aggregate metric 65. Thus, function 61 illustrates a significantly different situation than is presented by function 62; for the latter, the client 10 experiences very little aggregate utility 64 unless the aggregate metric 65 reaches a fairly high value, and in that high-value range small improvements in the value of the aggregate metric 65 correspond to large increases in aggregate utility 64. Function 62 is typical, e.g., where reliability is very important to the client 10 or where the contract 24 pertains to a project that has very little value unless it is fully or nearly fully completed.

The parameter $\alpha$ describes the potential upside to the service/resource provider 20 of providing good performance. For example, with $\alpha=1.4$ and $\beta=1$, the client is offering a bonus of 40% of the sum of individual job utility values for completion of all the jobs in the overall deliverables package. In this regard, the quantity (aggregate utility-1) generally is referred to herein as a "bonus" when it is positive and a "penalty" when negative, although such terms generally are subjective (i.e., dependent upon what one considers to be the baseline).

It should be noted that the family of aggregate utility functions identified above is merely exemplary. An aggregate utility function can be of any form, including, e.g., any other polynomial, a step function, any other piecewise-linear function, or an exponential. In addition, composite utility functions can be constructed using more than one aggregate metric. In any event, the aggregate utility function preferably is monotonic so as to facilitate identification of the current operating point (as discussed in more detail below).

Also, as mentioned above, the aggregate utility function need not be specified contractually or even specified by the client 10. For example, the service/resource provider 20 can construct an aggregate utility function based on its expected utility, e.g., by considering explicit contractual terms together with extra-contractual factors, such as the impact on its relationship with the particular client 10 and the impact on the general reputation of service/resource provider 20 in the event that a certain aggregate performance or quality metric falls below certain specified values. In a similar vein, aggregate utility functions that span multiple contracts can be constructed, e.g., to capture concerns about overall customer satisfaction and/or most-favored customers.

Job Utility

Depending upon the individual contract (12 or 24), the job utility can be expressed as a constant value or as a function, e.g., of a job-performance or other job-related metric. Generally speaking, a job utility function expresses client utility for a particular job 14 as a function of a specified job metric. Ordinarily, this metric will be different than the aggregate metric that is used to determine aggregate utility. In many cases, the job metric will be completion time. For example, each job might have an associated time-varying utility function that expresses the maximum price that the client is willing to pay for that job to be run, and how such utility decreases with elapsed time.

Figure 3:
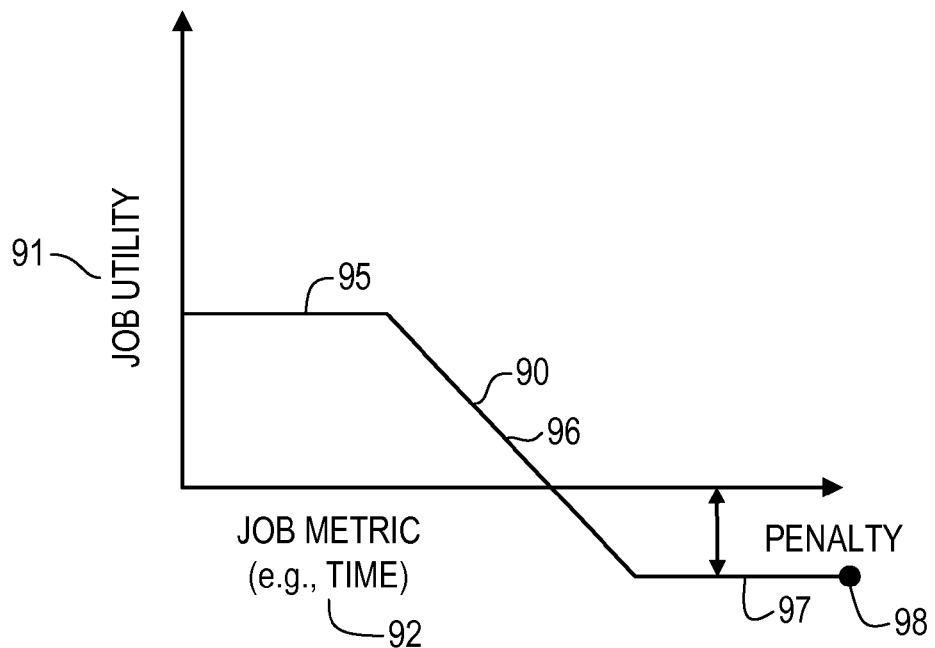
FIG. 3 illustrates an example of a job utility function according to a representative embodiment of the present invention.

An example 90 of such a job utility function is illustrated in FIG. 3. Job utility function 90, which expresses job utility 91 as a function of completion time 92, is constructed using a simple three-part shape. It starts at a constant value 95, continues at such constant value 95 for a period of time, then declines 96 at a constant rate (to reflect increasing disappointment in a late result), and eventually reaches a maximum negative penalty 97. Finally, the function 90 reaches a timeout 98, indicating that the client 10 is no longer interested in the job's output. The job value to the client 10 is the value of the job's utility function 90 at the moment that the job is completed and its results are delivered to the client 10. Typically, once the service/resource provider 20 accepts a job 14, it will either perform the accepted job 28 and deliver its results or it will cancel the job 28, in which latter case a cancellation penalty 97 equal to the maximum negative value in the job utility function 90 is due to the client 10. As with the aggregate utility function discussed above, that penalty can be either explicit or implicit and either tangible or intangible. Similarly, the job utility (whether constant or a function of the job metric) can be defined contractually between client 10 and service/resource provider 20, or can be constructed internally and independently by service/resource provider 20.

Techniques Using Aggregate Utility Function

In the preferred embodiments of the invention, the aggregate utility function is evaluated at a current operating point and the resulting value is used to modify the nominal (or otherwise perceived) utility (or value) of the individual jobs. Essentially, the preferred embodiments apply aggregate-level consequences to the problem of making individual job, contract and other workflow decisions, such as whether to admit jobs or contracts (admission control), when to run jobs (scheduling), and when to abandon jobs and/or entire contracts (usually to preempt them in order to be able to perform a more profitable job or contract).

Figure 4:
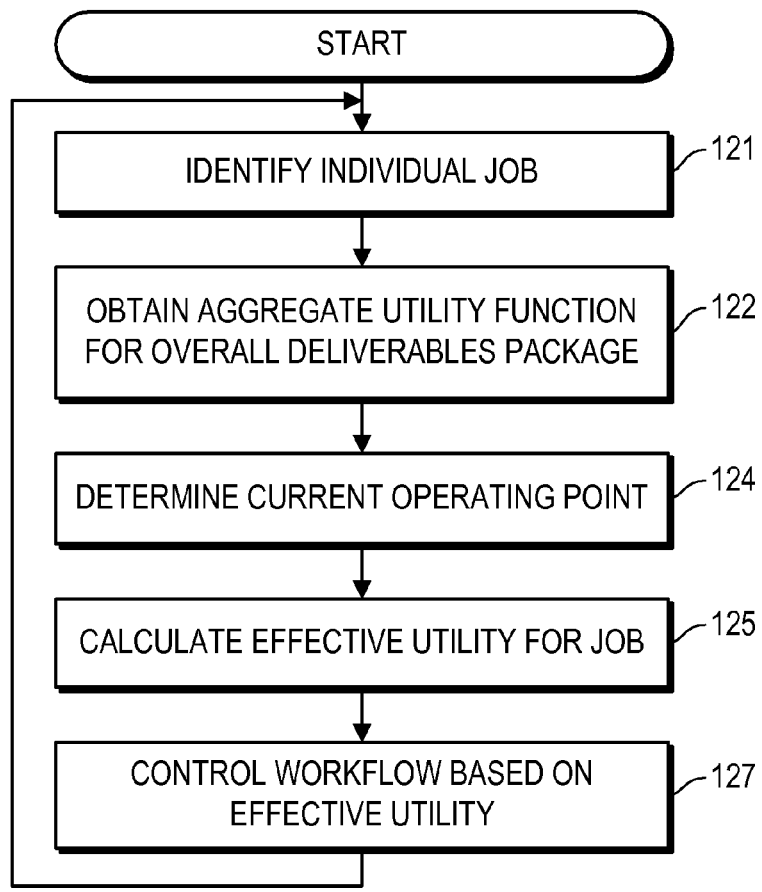
FIG. 4 is a flow diagram illustrating use of an aggregate utility function according to representative embodiments of the present invention.

FIG. 4 is a flow diagram illustrating use of an aggregate utility function according to representative embodiments of the present invention. In the preferred embodiments, the entire process shown in FIG. 4 is implemented in software (e.g., executing computer-executable process steps off of a computer-readable medium), but instead can be implemented in any of the other ways discussed herein.

The general technique illustrated in FIG. 4 can be applied to a wide variety of workflow determinations. Although a couple of examples are discussed below (pertaining mainly to admission and scheduling), such examples should not be considered limiting. Rather, the general technique of FIG. 4 typically can be applied to any determination that is based on a value for an individual job's utility or value.

Generally speaking, in the present technique aggregate-level consequences are translated down to the job level by constructing an effective job utility for each relevant job that is part of a contract (or other overall deliverables package) having an associated aggregate utility function. As noted above, an aggregate utility function can always be independently defined by the service/resource provider 20. More preferably, the effective job utility is calculated by applying a bias to the job's original or independent utility. Accordingly, the form of the effective job utility (either constant or a function of a job metric) generally will match the form of the job's stated independent utility. As described in more detail below, the calculated effective job utility preferably is used in admission and scheduling decisions, in place of the original or independent job utility.

Referring to FIG. 4, initially in step 121 an individual job is identified. Ordinarily, the identified job (14 or 28) will have some bearing on a workflow determination that is being made. As noted elsewhere herein, such a determination might involve, e.g., contract or job admission, job scheduling, or determination as to whether to abandon a job or contract. More specifically, the individual job might be the particular job that is under consideration, a job under a contract that currently is being submitted, or a job (or its corresponding contract) that is relevant to a determination being made about another job or contract (e.g., where the relative profitabilities of different contracts and/or jobs are being assessed for determining whether to accept or abandon a job or contract). In other words, the individual job selected in this step 121 preferably is driven by the particular determination being made (e.g., supplied by a separate automated process that is making such determination), as discussed elsewhere in this disclosure. In many cases, multiple jobs will be selected and evaluated in connection with a single workflow determination.

Next, in step 122 an aggregate utility function is obtained for an overall deliverables package that includes the individual job identified in step 121. If the identified job is governed by a particular contract (12 or 24), then the aggregate utility function generally can be obtained in a straightforward manner by specifying the contract terms as a mathematical function. Alternatively, the service/resource provider 20 can generate an aggregate utility function based on expected tangible and/or intangible consequences. Still further, combining the preceding approaches, when defining the aggregate utility function, the defined consequences in an applicable contract can be supplemented to incorporate expected consequences that are not contractually specified. Ordinarily, definition of the actual aggregate utility function will require some manual involvement or involve some manual intervention, and an automated process implementing this step 122 merely accesses or inputs the defined function.

Step 124 identifies the current operating point on the aggregate utility function. In the preferred embodiment, the current operating point is determined based on past performance and/or expected future jobs, in connection with the overall deliverables package. More preferably, identification of the current operating point assumes full satisfaction of all requirements pertaining to the aggregate metric 65 on a go-forward basis. For example, if the aggregate metric 65 is the fraction of jobs completed on-time, there are 100 jobs total, 20 out of the 100 jobs have been submitted so far, and 18 of the 20 have been completed on time, then the current operating point is identified using (or based on) a value for the aggregate metric 65 of (100−2)/100=0.98.

In step 125, based on the aggregate utility function obtained in step 122 and the current operating point identified in step 124, an effective utility is calculated for the individual job that was identified in step 121. Preferably, the step involves a determination of how different decisions will move the current operating point on a curve corresponding to the aggregate utility function and/or a corresponding determination of how the value of the aggregate utility 64 will change as a result of such different decisions.

The following is an example of pseudo-code for calculating an effective utility according to one representative embodiment of the present invention. In this example, the aggregate metric 65 is the percentage of jobs completed.

computeEffectiveUtility( input:

```
U(t) // original job utility function
f(x) // aggregate utility function
total // number of jobs in the deliverables package
dropped // number of jobs already abandoned
mean_value // average for all [future] jobs
``` output:

```
U'(t) // effective utility function
{
    // "old_fraction" is the position on the
    // aggregate-utility curve before this job
    // arrived - i.e., "x" in f(x)
    old_fraction = 1 − (dropped / total);
    // "new_fraction" is the new position on the
    // aggregate-utility curve if this job
    // were to be dropped
    new_fraction = 1 − ((dropped + 1) / total);
    //potential is how many jobs could complete
    potential = total − dropped;
```

```
            // bias is how far to boost the job's
            // effective value
            bias = mean_value *
                ((potential * f(old_fraction)) –
                ((potential – 1) * f(new_fraction)) – 1);
            // create the effective utility function
            U'(t) = U(t) + bias;
        }
```

Figure 5:
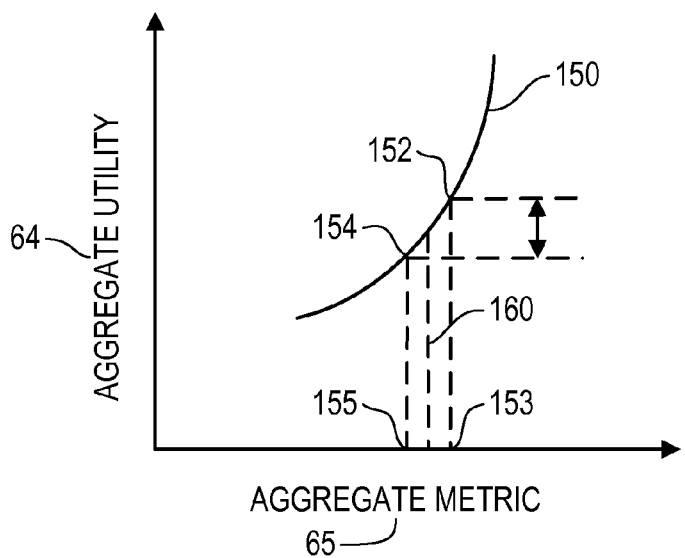
FIG. 5 illustrates a portion of an aggregate utility function and shows how different decisions can affect aggregate utility according to representative embodiments of the present invention.

FIG. 5 shows a portion of an aggregate utility function 150 and helps to explain how the effective value is computed in accordance with the foregoing pseudo-code. The foregoing process first determines the current operating point 152 (old_fraction), which in this case is the fraction of jobs that would be finished if this, and all subsequent jobs, were run to completion (i.e., 1 minus the fraction of jobs that have been rejected or cancelled so far). The bias then is the drop in value of the aggregate utility (based on the aggregate utility function 150) from completing one fewer job, multiplied by the expected (i.e., average) value of all jobs under the contract to which the present job (identified in step 121) pertains. In other words, the bias is calculated by multiplying the aggregate utility value at the current operating point 152 by the total number of jobs remaining, including the present job, and then subtracting a quantity that is obtained by multiplying the aggregate utility value at the new operating point 154 by the total number of jobs remaining excluding the present job, where the current operating point 152 is determined by identifying the current aggregate metric value 153 on the assumption that the present job and all future jobs will be completed, and where the new operating point 154 is determined by identifying the new aggregate metric value 155 that would result if the present job were not completed (but assuming all future jobs will be).

Figure 6:
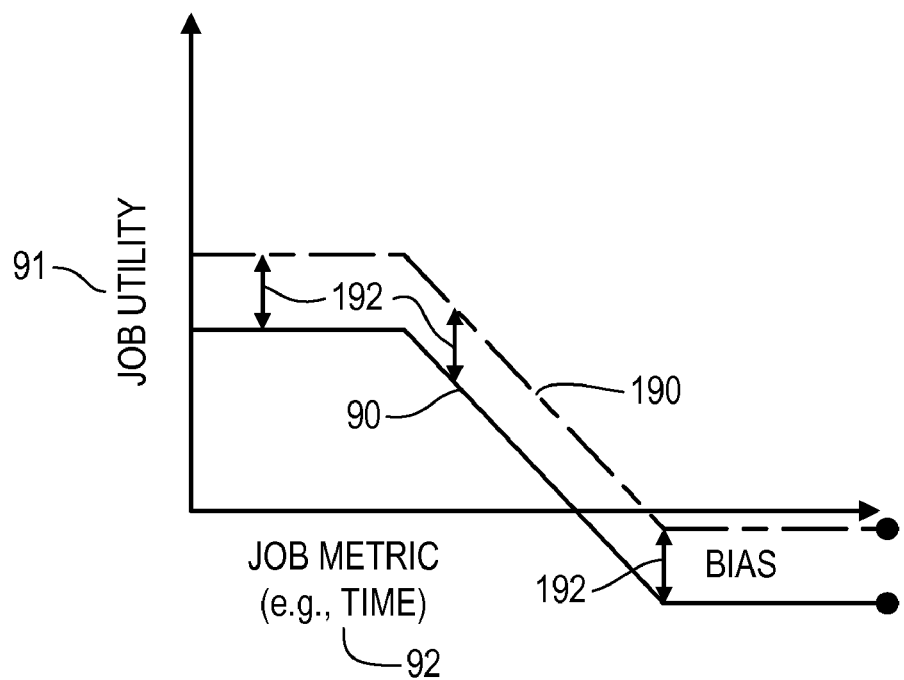
FIG. 6 illustrates an example of how bias is applied to a job utility function according to a representative embodiment of the present invention.

After calculating the bias, it is added to the independent utility for the present job in order to generate the effective utility for the present job. In other words, if the independent utility of the present job were a constant, then the effective utility is equal to that value plus the bias. On the other hand, referring to FIG. 6, if the independent utility of the present job were a function 90, then the effective job utility function 190 is obtained by increasing each job utility value of the original function 90 by the bias 192.

The effect of the bias is to assign high values to jobs that would have a large effect on the aggregate utility function if they were abandoned—as, for example, near 100% for large-β functions (highly-sensitive clients)—but have little or no effect on jobs that are at relatively insensitive portions of the aggregate utility function.

As a concrete example, assume that the contract specifies 20 jobs with a mean job value of 15, and further assume that the service/resource provider 20 already has failed to finish 2 of 12 jobs so far. When the present job 14 arrives, the operating point old_fraction is 0.90, the new_fraction is 0.85, and potential is 18. Therefore, the bias is bias=15×[18×$f$(0.90)–17×$f$(0.85)–1]. If the aggregate utility function $f$(x)=2x($\alpha$=2, $\beta$=1), then the bias is 37.5. A more sensitive aggregate utility function $f$(x)=x$^3$ generates a bias of only 25.2, because the 10% of jobs that were already missed have pushed the operating point to a place where the aggregate utility value is already heavily degraded (and, in the present example, cannot be restored to a higher point on the curve). The same $f$(x)=x$^3$ correctly generates a bigger bias when the current operating point is 1.0 (bias=41.25), because the downside of not running even one job is so large near the 100%-complete operating point.

It is noted that because of the way that the operating point is defined in the preceding example, the new operating point can only be the same or lower than the current operating point. However, in other embodiments, the operating point can move from a current position 160 to a higher position 152 if one decision is made (e.g., to accept the job) and can move from the current position 160 to a lower position 154 if another decision is made (e.g., to reject the job).

In step 127, workflow is controlled based on the effective utility calculated in step 125. Typically, this step involves evaluating competing alternatives, selecting the one that results in the greatest overall net utility, and implementing that alternative (e.g., by accepting or rejecting a job, accepting or rejecting a contract, constructing or making a change to a job-performance schedule, or the like).

Upon completion of step 127, processing returns to step 121 in order to select and process either another job or, due to changed circumstances, the same job. As indicated above, the entire process illustrated in FIG. 4 preferably is repeated multiple times for each determination made by system 20, in the course of evaluating individual jobs and contracts in comparison to other jobs and contracts. In addition, multiple determinations are made by system 20 in the course of managing workflow in a constantly changing environment.

In this regard, it is noted that an increase in the aggregate utility 64 for any particular job under consideration generally is desirable and a decrease is undesirable, in the abstract. However, for most purposes of the present invention a more important consideration is how each decision affects aggregate utility across a number of different contracts and/or jobs (both existing and potential). Preferably, the decision is made based on a goal of maximizing the aggregate utility across all of the contracts and/or jobs that are affected by the decision. For this purpose, the various aggregate utilities and job utilities preferably are normalized across all such contracts and/or jobs. The easiest way to accomplish such normalization is to state each utility as a monetary value in a common type of currency (e.g., dollars).

In most of the embodiments described herein, decisions are made with respect to a single job at a time. In alternate embodiments the effects of multiple jobs are considered simultaneously. Presently, however, such alternate embodiments are not preferred because the additional computational cost would exceed the incremental improvements in the results that can be obtained.

Additional details regarding how the general technique outlined above is applied to specific workflow decisions are set forth in the following sections. Specifically, the following sections describe Contract Admission Control, Job Admission Control and Job Scheduling, in turn.

Contract Admission Control

The contract admission control process (e.g., performed by module 22) determines which client job-sequences to accept. Its purpose is to avoid long-term service over-commitments, and to establish a binding contract between the service/resource provider 20 and its client 10. The process preferably is run whenever a potential new contract 12 arrives. It first runs a feasibility check to determine if it can accept the contract 12 (i.e., it will be able to get enough resources 35 to do so), and then a profitability check to see if it should (i.e., if its profitability is likely to increase if the contract 12 is accepted). If the contract 12 passes both tests, it is accepted; if not, it is declined and the client 10 can seek service elsewhere. Ordinarily, there is no penalty for refusing a contract 12, but once accepted it is mutually binding on both parties.

In the preferred embodiments, the contract-feasibility check is selected from the following policies:

contract-load=oblivious: The potential contract 12 is always admitted.

contract-load=average: The average load due to the expected job flow from the potential contract 12 is added to the existing average load of existing contracts 24 over the duration of the potential contract 12. Then, the potential contract 12 is accepted only if the resulting load can be accommodated within the predicted resource availability for the contract's duration.

contract-load=preempt-average: The potential contract 12 is accepted if it passes the contract-load=average admission test. Otherwise, the potential contract 12 is accepted if by replacing an existing contract 24 with which it overlaps, the net utility (or profit) can be increased.

contract-load=preempt-conservative: The potential contract 12 is accepted on the same basis as the contract-load=preempt-average admission test, but this test uses a conservative estimate of the additional load applied by the potential new contract 12 and a conservative estimate of the load attributed to the existing contracts 24, in each case of one standard deviation above its mean load (i.e., the load used for admission/preemption purposes is the mean load plus 1 standard deviation).

For purposes of calculating whether net utility increases in the contract-load=preempt-average and contract-load=preempt-conservative techniques, the effective utilities of the accepted jobs 28 and the potential jobs 14 (both already-submitted and expected-to-be-submitted jobs 14 under the existing contracts 24), as well as the effective utilities of the jobs expected to be submitted under the potential new contract 12 presently under consideration, preferably are calculated (e.g., as discussed above) and used.

If the potential contract 12 is determined to be feasible, its profitability is then checked, using one of the following tests:

contract-cost=any: The cost to rent resources to execute the contract is ignored; no contract is rejected for this reason.

contract-cost=variable: Profitability predictions are calculated separately for each different cost period and added; only contracts that increase the overall profit rate are accepted.

For purposes of calculating profitability under either such technique, the effective utilities of the accepted jobs 28 and the jobs 14 (both already-submitted and expected-to-be-submitted jobs 14 under the existing contracts 24), as well as the effective utilities of the jobs expected to be submitted under the potential new contract 12 presently under consideration, preferably are calculated (e.g., as discussed above) and used.

Job Admission Control

To avoid short-term overload, module 27 runs a job admission-control process when a new job 14 arrives, in order to decide whether it should accept the new job 14. Rejected jobs preferably are not further considered, although the rejection likely will affect the aggregate metric 65 for the corresponding existing contract 24. It is noted that some jobs are independently unprofitable, even if there were no other jobs in the system, because the cost of executing them would exceed their effective utility.

Consideration of aggregate utility functions complicates job-admission control; if the current operating point on a given aggregate utility function is particularly sensitive to non-completion of a given job 14, it sometimes will be more profitable to complete the job 14, even if it otherwise is independently unprofitable, in order to avoid a larger penalty from dropping it. A useful way to think about this is to consider the cost to the service/resource provider 20 of not running a particular job 14. The lost aggregate utility sometimes can be larger than the cost of running an unprofitable job. It might even be larger than the penalty for cancelling the job once it has been accepted. In either case, a fix is to make the job appear to be sufficiently profitable for it to be accepted and run. This is achieved through the use of an effective job utility calculation, as described above.

Job Scheduling

Once a job 28 is accepted, the job scheduler 29 decides when it should be run. Since job-scheduling is NP-hard, heuristic solutions normally are used. The preferred approach is to use a FirstProfitRate scheduler, which is a greedy, cost-aware scheduler derived from FirstProfit. It sorts jobs by declining expected contribution to profit rate, and selects the first job to execute from the front of that list.

In the preferred embodiments, the job scheduler 29 maintains a preferred schedule of pending jobs, and attempts to execute that schedule on the resources 35 that are available to it. The scheduler 29 preferably is invoked whenever a job arrives, a job completes, or the number of available resources 35 changes. If the scheduler 29 decides that a job can be run, it selects an appropriate resource 35, and assigns the first job on the schedule to it; this is repeated until the scheduler has no more jobs that can be run or no remaining available resources 35.

In the present embodiment, once a job starts running it runs to completion; it will not be preempted or aborted. However, in alternate embodiments the possibility of preempting or aborting a job 28 that is being executed is considered, e.g., by job-acceptance module 27, job scheduling module 29 or even contract acceptance module 22.

Ordinarily, if a job's start is delayed too long, its job-utility-function (e.g., function 90) value minus the cost of running it will be less than its cancellation penalty. In such a case, the scheduler 29 preferably chooses to abandon the job and pay the cancellation penalty.

System Environment.

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks (e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks); a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an optomagnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

Additional Considerations.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of controlling workflow, comprising:
 (a) identifying an individual job that is part of an overall deliverables package, the overall deliverables package covering a plurality of jobs;
 (b) obtaining, by a system having a processor, an aggregate utility function that specifies utility based on a specified aggregate metric across the overall deliverables package;
 (c) determining, by the system, a current operating point on the aggregate utility function, wherein the current operating point on the aggregate utility function is based on one or more of: (i) past processing of jobs in the overall deliverables package, and (ii) expected future jobs in the overall deliverables package;
 (d) calculating, by the system, an effective utility for the individual job based on the aggregate utility function and the current operating point, wherein calculating the effective utility based on the aggregate utility function comprises modifying an independent utility function of the individual job by combining the independent utility function of the individual job with a bias value that represents a change in value of the aggregate utility function due to excluding the individual job; and
 (e) controlling, by the system, execution of work based on evaluation of the effective utility for the individual job.

2. A method according to claim 1, wherein said step (e) comprises one or more of: (i) determining whether to accept a service contract; (ii) determining whether to perform a particular job; (iii) determining whether to abandon a job; and (iv) scheduling jobs from among a second plurality of jobs, the second plurality of jobs including both the individual job and jobs that are outside the overall deliverables package.

3. A method according to claim 1, wherein controlling the execution of work in step (e) comprises determining whether to perform the individual job.

4. A method according to claim 1, wherein the overall deliverables package is defined by a customer agreement, and the aggregate utility function is based on terms of the customer agreement.

5. A method according to claim 1, wherein the aggregate utility function is generated internally based on estimations of impact on one or more of: (i) customer satisfaction, (ii) customer complaints, (iii) customer revenue, and (iv) customer goodwill.

6. A method according to claim 1, wherein the aggregate utility function specifies utility based on meeting a specified performance standard for a specified fraction of a total number of jobs in the overall deliverables package.

7. A method according to claim 1, wherein step (d) is based on a decrease in aggregate utility that would occur if the individual job were not to be accepted or completed.

8. A method according to claim 1, further comprising repeating steps (c)-(e) a plurality of times.

9. A method according to claim 1, wherein the specified aggregate metric comprises one or more of (i) timeliness, (ii) accuracy and (iii) satisfaction of specified requirements.

10. A method according to claim 1, wherein the effective utility is expressed as a function of a job-performance metric.

11. A non-transitory computer-readable storage medium storing computer-executable instructions for controlling workflow, said instructions upon execution by a system having a processor causing the system to:
(a) identify an individual job that is part of an overall deliverables package, the overall deliverables package covering a plurality of jobs;
(b) obtain an aggregate utility function that specifies utility based on a specified aggregate metric across the overall deliverables package;
(c) determine a current operating point on the aggregate utility function, wherein the current operating point on the aggregate utility function is based on one or more of: (i) past processing of jobs in the overall deliverables package, and (ii) expected future jobs in the overall deliverables package;
(d) calculate an effective utility for the individual job based on the aggregate utility function and the current operating point, wherein calculating the effective utility based on the aggregate utility function comprises modifying an independent utility function of the individual job by combining the independent utility function of the individual job with a bias value that represents a change in value of the aggregate utility function due to excluding the individual job; and
(e) control execution of work based on evaluation of the effective utility for the individual job.

12. A computer-readable storage medium according to claim 11, wherein said step (e) comprises one or more of: (i) determining whether to accept a service contract; (ii) determining whether to perform a particular job; (iii) determining whether to abandon a job; and (iv) scheduling jobs from among a second plurality of jobs, the second plurality of jobs including both the individual job and jobs that are outside the overall deliverables package.

13. A computer-readable storage medium according to claim 11, wherein controlling the execution of work in step (e) comprises determining whether to perform the individual job.

14. A computer-readable storage medium according to claim 11, wherein the aggregate utility function specifies utility based on meeting a specified performance standard for a specified fraction of a total number of jobs in the overall deliverables package.

15. A computer-readable storage medium according to claim 11, wherein step (d) is based on a decrease in aggregate utility that would occur if the individual job were not to be accepted or completed.

16. A computer-readable storage medium according to claim 11, wherein the specified aggregate metric comprises one or more of (i) timeliness, (ii) accuracy and (iii) satisfaction of specified requirements.

17. A method according to claim 1, wherein the specified aggregate metric includes a fraction of jobs of the overall deliverables package completed, and the aggregate utility function specifies a utility effect as a function of the fraction.

18. The method of claim 1, wherein the aggregate utility function is representable by a curve that specifies a relationship between aggregate utility and the specified aggregate metric, wherein the current operating point is a point on the curve based on past processing of jobs in the overall deliverables package.

19. The method of claim 1, further comprising defining a new operating point that is based on past processing of jobs and based on an assumption that the individual job will be dropped, wherein the bias value is calculated based further on a second aggregate utility equal to the aggregate utility function at the new operating point.

20. A computer-readable storage medium according to claim 11, wherein the specified aggregate metric includes a fraction of jobs of the overall deliverables package completed, and the aggregate utility function specifies a utility effect as a function of the fraction.

21. The computer-readable storage medium according to claim 11, wherein the aggregate utility function is representable by a curve that specifies a relationship between aggregate utility and the specified aggregate metric, wherein the current operating point is a point on the curve based on past processing of jobs in the overall deliverables package.

22. The computer-readable storage medium according to claim 11, wherein the instructions upon execution cause the system to further define a new operating point that is based on past processing of jobs and based on an assumption that the individual job will be dropped, wherein the bias value is calculated based further on a second aggregate utility equal to the aggregate utility function at the new operating point.

* * * * *